S. A. WEGLAND.
CUTTING TOOL.
APPLICATION FILED APR. 16, 1912.

1,156,336. Patented Oct. 12, 1915.

UNITED STATES PATENT OFFICE.

SAMUEL A. WEGLAND, OF CHICAGO, ILLINOIS, ASSIGNOR TO RICH TOOL COMPANY, OF CHICAGO, ILLINOIS, A CORPORATION OF ILLINOIS.

CUTTING-TOOL.

1,156,336.  Specification of Letters Patent.  Patented Oct. 12, 1915.

Application filed April 16, 1912. Serial No. 691,167.

*To all whom it may concern:*

Be it known that I, SAMUEL A. WEGLAND, a citizen of the United States, residing at Chicago, in the county of Cook and State of Illinois, have invented certain new and useful Improvements in Cutting-Tools, of which the following is a specification.

This invention relates to tools adapted to be used in connection with a drill press or mechanism of a similar character.

The invention is concerned with a tool formed of two parts, and by such construction it is sought to cheapen its cost of manufacture, to strengthen its construction, and to expedite its insertion and removal. These and other objects will appear from a description of the invention, as hereinafter set forth and claimed.

Figure 1:
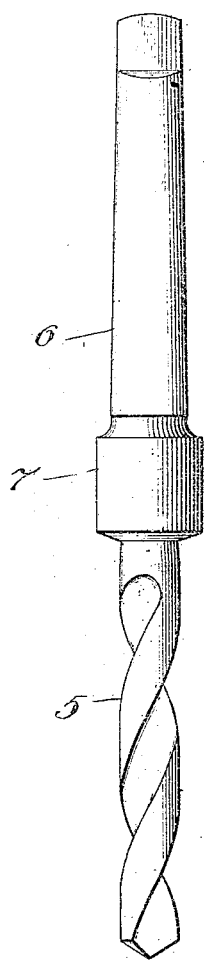
Figure 2:
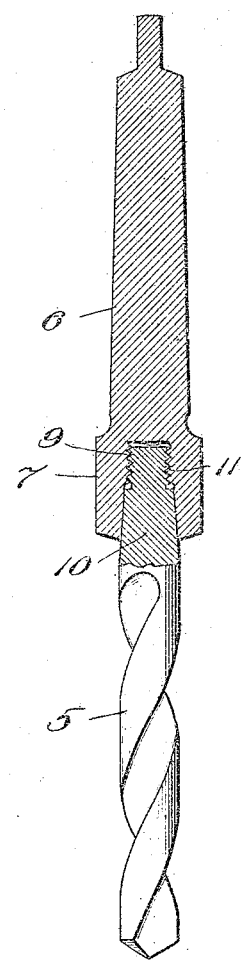
Figure 3:
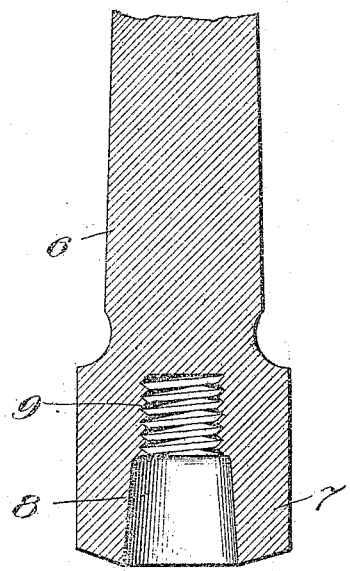
Figure 4:
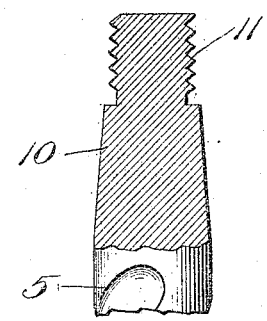

In the drawing, Figure 1 is an elevation of the tool viewed in its entirety; Fig. 2 is a longitudinal section therethrough; Fig. 3 is an enlarged detail in section of the shank and tool socket therein; and Fig. 4 is an enlarged detail in section of the head of the tool.

The invention comprises two principal elements, viz., a tool proper 5 and a shank 6 formed of a size and taper adapted to be received within a drill press (not shown). The shank is provided at its enlarged end with a head 7 having a tapered socket 8 formed therein, a portion 9 thereof being threaded. The tool which, for purposes of illustration, is here represented as a drill, is formed with a head 10 tapered to conform with the socket 8, and with a threaded portion 11 adapted to engage with the threads 9 in the shank socket. The shank and tool portions are further constructed of different qualities or kinds of steel, the former being so constituted as to withstand torsional strain and made preferably of axle steel, and the latter to cut or engage with the work, and made preferably of tool steel.

It has been customary to construct tools with a shank to be received within a drill press, the whole necessarily being formed of tool steel, in order to constitute a serviceable instrument. On account of the high cost of this grade of steel, however, tools of this character are highly expensive. Furthermore, the steel employed in such tools, while adapted for cutting purposes, does not possess as high a degree of torsional strength as is desirable for high speed tools. This difficulty is overcome in the present invention by constructing the tool, as a whole, of two separable parts, the materials of which they are constituted being such as to adapt them best to the functions which they are called upon to perform. The necessity of constructing tools operated at high speed of sufficient strength to withstand the additional torsional strain involved has frequently demanded a sacrifice in the quality of the tool steel used in the construction of the tool.

The present invention is further characterized by the means which have been devised to effect a connection between the tool and its shank. Accurate centering of the tool with respect to the shank is provided by arranging a taper on the head of the tool adapted to register and conform with a similarly arranged taper upon the socket walls, this engagement of the tapered tool head within the socket also tending to prevent any loose play therein. The threaded portions 9 and 11 have been arranged to coöperate with the tapered engagement to bring the tool head tightly against the tapered socket and to maintain the parts in such engaging relation. When so connected the tool is at all times centered and preserved against lateral or longitudinal movement. When the tool is operated at high speed, the torsional strain which might otherwise ordinarily be communicated to the engaging threads is distributed and minimized through the engaging tapered surfaces of the tool head and shank socket.

It is possible not only to manufacture tools of the above character at a considerably less cost than is usually the case, but also to supply or renew the tool portions thereof from time to time with a minimum of expense. Approximately one-half of the high grade tool steel which is required in the construction of a tool and its shank is eliminated. A single shank may obviously be used with a number of different tools varying considerably as to their size and character. It is apparent, therefore, that, in the construction described, it is possible to produce a tool specially adapted for high speed purposes which combines with economy in manufacture a more substantial construction than has heretofore been secured.

I claim:

In a device of the class described, the combination of a shank member formed of axle steel, and provided in its lower end with a circular socket, having the lower portion of its walls tapering toward its inner end, and having that portion of its walls above said tapered portion threaded, a cutting member formed of tool steel, and provided at its upper end with a circular portion tapered to engage the tapered part of said socket, and having its extreme end portion threaded to engage a threaded part of the socket, the tapered portion of the cutting member being of a size whereby, when the two members are connected together, the surfaces of the tapered portions of the members will engage prior to the threaded end of the cutting member reaching the terminus of the threaded portion of the socket, substantially as described.

SAMUEL A. WEGLAND.

Witnesses:
J. Fox,
CHAUNCEY McCORMICK.